March 23, 1971    J. A. GLASSMAN    3,572,341
CATAMENIAL TAMPON

Filed Feb. 20, 1969    2 Sheets-Sheet 1

Inventor.
Jacob A. Glassman
Elmer L. Zwickel
Atty.

March 23, 1971 J. A. GLASSMAN 3,572,341
CATAMENIAL TAMPON
Filed Feb. 20, 1969 2 Sheets-Sheet 2
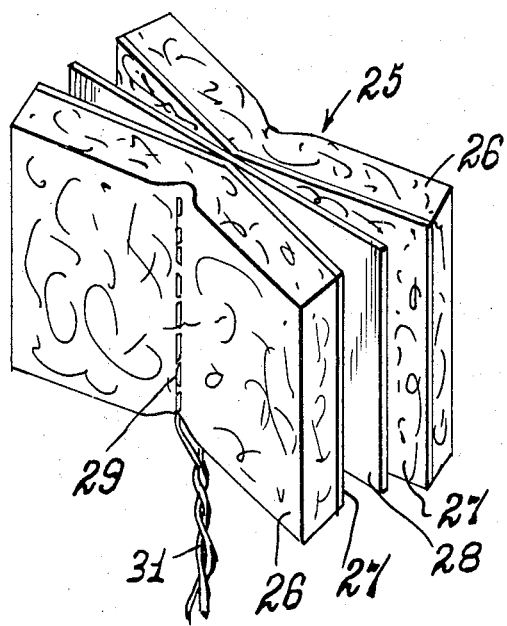
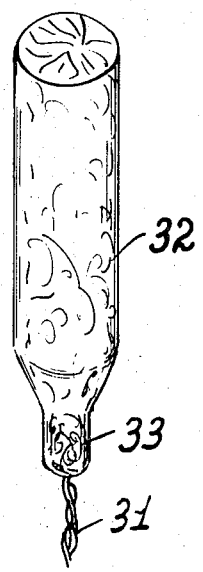
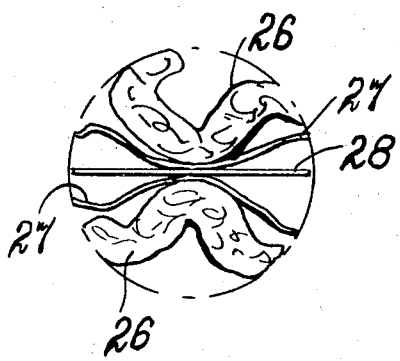
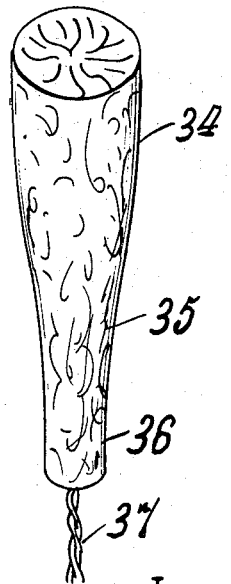
Inventor:
Jacob A. Glassman
Elmer L. Zwickel
Atty.

United States Patent Office 3,572,341
Patented Mar. 23, 1971

3,572,341
CATAMENIAL TAMPON
Jacob A. Glassman, 1680 Meridian Ave.,
Miami Beach, Fla. 33160
Filed Feb. 20, 1969, Ser. No. 800,983
Int. Cl. A61f 13/20
U.S. Cl. 128—285
2 Claims

ABSTRACT OF THE DISCLOSURE

An externally waterproofed catamenial tampon comprised of a laminated structure which is highly compressed in its tail portion so as to resist free flow of waste fluids and including deodorant impregnated interleaves.

---

The invention relates to improvements in tampons and is more particularly concerned with a laminated tampon formed of a plurality of layers of cotton fibers having interleaved therein a layer or layers of gauze impregnated with a deodorant, antiseptic or the like, including a critically located layer of moisture impervious material. The tampon is further characterized by having three zones of compression, the insert end being light compressed or not compressed at all, an intermediate area or zone more tightly compressed and its tail end zone or outer extremity very tightly compressed. The tampon is thus fabricated in a manner to permit maximum expansion of the lightly or non-compressed zone within the vaginal passage, and substantially no or delayed expansion of the tail end zone so as to thereby present a bottom zone that is very resistant to the free flow of menstrual fluids and other wastes. This provides a barrier to leakage of wastes prior to total absorption by the tampon.

It is therefore an object of the invention to provide a tampon of the character referred to.

Another object is to provide a tampon that is highly compressed at its tail or bottom end so as to resist free flow of waste fluids.

Another object is to provide a tampon fabricated of multiple layers of absorbent material with interspersed layers of gauze that are impregnated with a deodorant or the like.

Another object is to provide a tampon that includes a highly expansive zone at its insert end.

Another object is to provide tampons of the character displaced which are not expensive or difficult to manufacture, are not difficult to use and which are very efficient in use.

Other objects and advantages of the invention will become apparent with reference to the following description and accompanying drawings.

In the drawings:

FIG. 5 is a perspective view of another form of pad used to form a tampon.

FIG. 6 is a perspective view of a tampon formed from the FIG. 5 pad.

FIG. 7 is a top plan view of the tampon after it is inserted in the vaginal passage.

FIG. 8 is a perspective view of another form of tampon.

Figure 1:
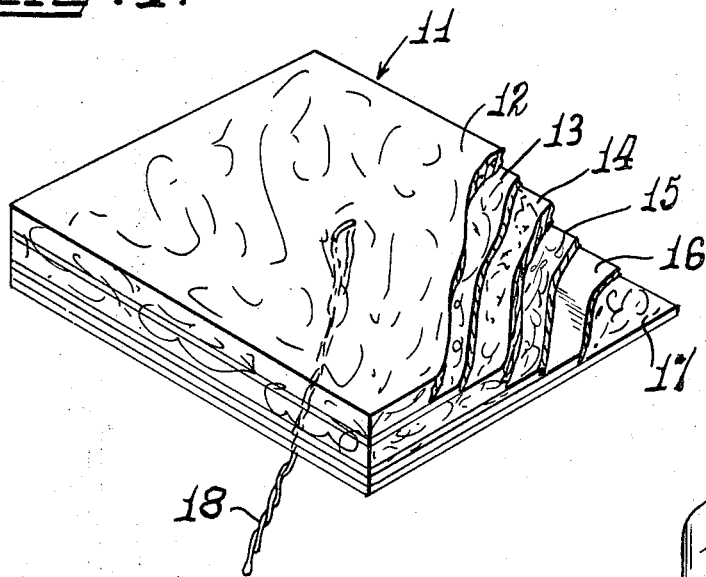
FIG. 1 is a plan view, partially broken away, of a pad used in the fabrication of a tampon.
Figure 3:
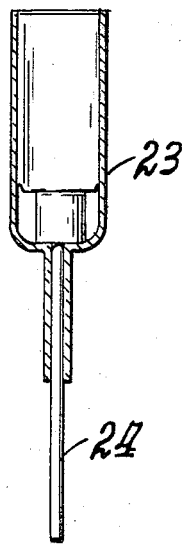
FIG. 3 is a view showing the tampon enclosed in an applicator.

Referring to the exemplary form of tampon illustrated in FIGS. 1 to 4, the tampon is fabricated from a substantially square or slightly elongated laminated pad 11 that is comprised of a top layer 12 of cotton fibers, and in succession, a layer 13 of gauze, a layer 14 of cotton fibers, a layer 15 of gauze and a layer 16 of moisture impervious material having a covering 17 of cotton fiber or gauze. The laminate assembly may be held together by any suitable means such as spot stitching or by the securement of pull string 18.

The gauze layers 13 and 15 are impregnated with a chemical such as a deodorant or antiseptic prior to their being embodied in the laminate assembly.

Figure 2:
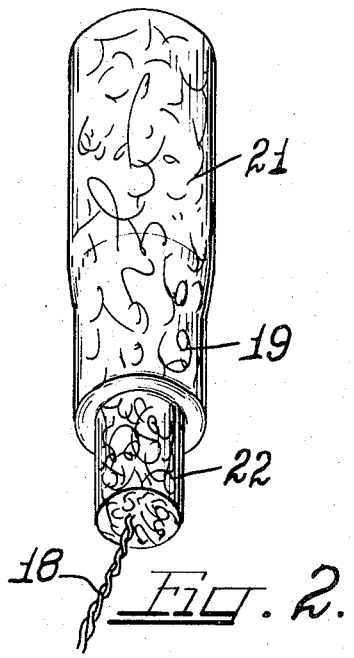
FIG. 2 is an elevational view of the tampon.

The laminate assembly then is rolled up, with the moisture impervious layer 16 and its thin covering 17 on the outside, to form the basic tampon shape as shown in FIG. 2. However, during the rolling or subsequently thereto, the intermediate zone, indicated at 19, is lightly compressed so as to make it more resistant to the flow of menstrual fluids than is the insert end zone indicated at 21, which preferably is not compressed. In the present disclosure the non-compressed insert end comprises about 50% of the length of the tampon, and the intermediate zone about 30%, although it is to be understood that these proportions can vary if found advisable for purposes of better control of the rate of moisture absorption.

The tail end zone 22, or remaining 20%, is highly compressed. This tail zone compression may be accomplished by application of high forces around the tail end after rolling and while the mass is in a dry state or following the application of heat or small amounts of moisture, whatever is commercially feasible. In any event, the highly compressed tail end zone 22 is adapted to retain its compressed condition at all times prior to and during use. If advisable, a small quantity of non-toxic adhesive may be applied thereto.

For convenience of application, the formed tampon may be enclosed in a conventional type of tubular applicator 23, which may include an ejector stem 24, and which is removed when the tampon is placed in the vaginal passage.

Figure 4:
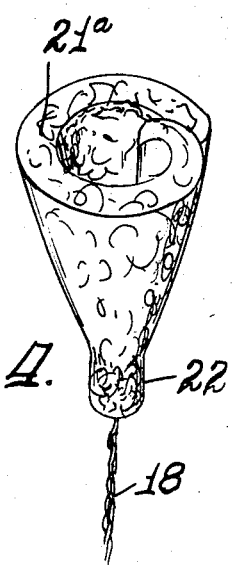
FIG. 4 is a perspective view of the tampon, as enlarged following insertion in the vaginal passage.

When the tampon is placed in the vaginal passage and absorption takes place, the non-compressed lead end 21 will expand and open up into a cup-shaped formation 21a, as shown in FIG. 4, while the highly compressed tail end zone 22 will remain compressed and resistant to the intake of moisture until the other portions or zones 19–21 have become totally saturated. There is thus provided an absorbent receptacle for menstrual fluids and clots which cannot penetrate the highly compressed tail end zone 22 prior to complete and total absorption by the more loosely compressed or non-compressed zones 19–21 of the tampon. Accordingly, the useful life of the tampon is extended far beyond that of any conventionally constructed tampons known to applicant.

In the embodiment shown in FIGS. 5 through 7, the tampon is fabricated from a laminated mass 25 comprised of outer layers 26 of cotton fibers each having on its inside face a layer 27 of deodorant impregnated gauze, and a center layer 28 of moisture impervious material. This laminate assembly may be secured by means of a central row of stitches 29 that terminates in a pull string 31. The mass is rolled or otherwise compacted, as shown at 32 in FIG. 6, and is then inserted into a tubular applicator as before recited. The lower or tail end of the mass is highly compressed, either while in its flat condition or after compacting, but prior to insertion in the applicator, so as to provide a very dense tail section or zone 33. When the tampon is fitted into the vaginal passage, the area of the mass above the highly compressed tail zone opens up and expands substantially into the condition shown in FIG. 7. Owing to the presence of the moisture impervious sheet 28, between layers 27, there is free separation of the layers of the mass so as to present maximum surface areas for reception of the waste fluids. The highly compressed tail end zone 33 will resist fluid absorption and expansion until the expanded portion of the tampon has become totally saturated.

In the FIG. 8 modification, the tampon is formed substantially conical with a non-compressed zone 34, a lightly compressed zone 35 and a highly compressed tail end zone 36 having a pull string 37 extended therefrom. This specific structure will open up when in use, in the manner described with reference to the FIGS. 1-4 construction.

It should be evident that applicant has provided tampons that will have maximum attraction for waste fluids in their major portion but which resists fluid absorption in their tail end zones to thereby provide maximum protection with no strike-through or spillage prior to total absorption by the entire tampon. In this manner the useful life of the tampons is prolonged without discomfort or premature feeling of wetness.

Although I have described preferred embodiments of my invention, in considerable detail, it will be understood that the description thereof is intended to be illustrative, rather than restrictive, as details of the structures may may be modified or changed without departing from the spirit or scope of the invention. Accordingly, I do not desire to be restricted to the exact constructions described.

I claim:

1. A catamenial tampon comprising a plurality of substantially rectangular layers of soft absorbent material arranged face to face, layers of deodorant impregnated gauze one overlying the inside opposed face of each of said layers of absorbent material, a layer of moisture impervious material interposed between said gauze layers, and stitching jointing said layers along their longitudinal centers.

2. The catamenial tampon recited in claim 1, in which said layers are highly compressed at one end.

References Cited

UNITED STATES PATENTS

| | | | |
|---|---|---|---|
| 2,330,257 | 9/1943 | Bailey | 128—285 |
| 2,355,628 | 8/1944 | Calhoun | 128—285 |
| 2,499,414 | 3/1950 | Rabell | 128—285 |
| 2,845,071 | 7/1958 | Wade | 128—285 |
| 3,013,558 | 12/1961 | Leupold | 128—285 |
| 3,371,666 | 3/1968 | Lewing | 128—296 |
| 3,431,910 | 3/1969 | Kokx | 128—285 |

FOREIGN PATENTS

| | | |
|---|---|---|
| 573,902 | 3/1958 | Italy. |
| 591,165 | 8/1947 | Great Britain. |
| 1,124,243 | 8/1968 | Great Britain. |

CHARLES F. ROSENBAUM, Primary Examiner